Ernö Gyarmati
Hubertus Nickel
INVENTORS.

BY

Karl F. Ross
Attorney 3,838,184
PROCESS FOR PRODUCING FUEL AND BREEDER BODIES FOR A NUCLEAR REACTOR
Ernö Gyarmati and Hubertus Nickel, Julich, Germany, assignors to Kernforschungsanlage Julich GmbH, Julich, Germany
Filed Dec. 1, 1970, Ser. No. 94,115
Claims priority, application Germany, Dec. 3, 1969, P 19 60 531.3
Int. Cl. G21c 3/04, 3/28
U.S. Cl. 264—.5
1 Claim

ABSTRACT OF THE DISCLOSURE

Metal-coated or metal-sheathed fuel or breeder cores form particles which are piled and, under a vacuum of $10^{-3}$ to $10^{-5}$ torr and at a temperature of 800°–2000° C., are sintered under a mechanical pressure of several 100 ponds/cm.$^2$. Such configurations are composite bodies, which are fuel elements or parts of fuel elements respectively. The metal covering of the particles has a high melting point and may be molybdenum, zirconium, vanadium or niobium and, at each fusion interface, diffuses with the metal of the neighboring shell. The interstices between the sintered particles form coolant channels.

(1) FIELD OF THE INVENTION

Figure 1:
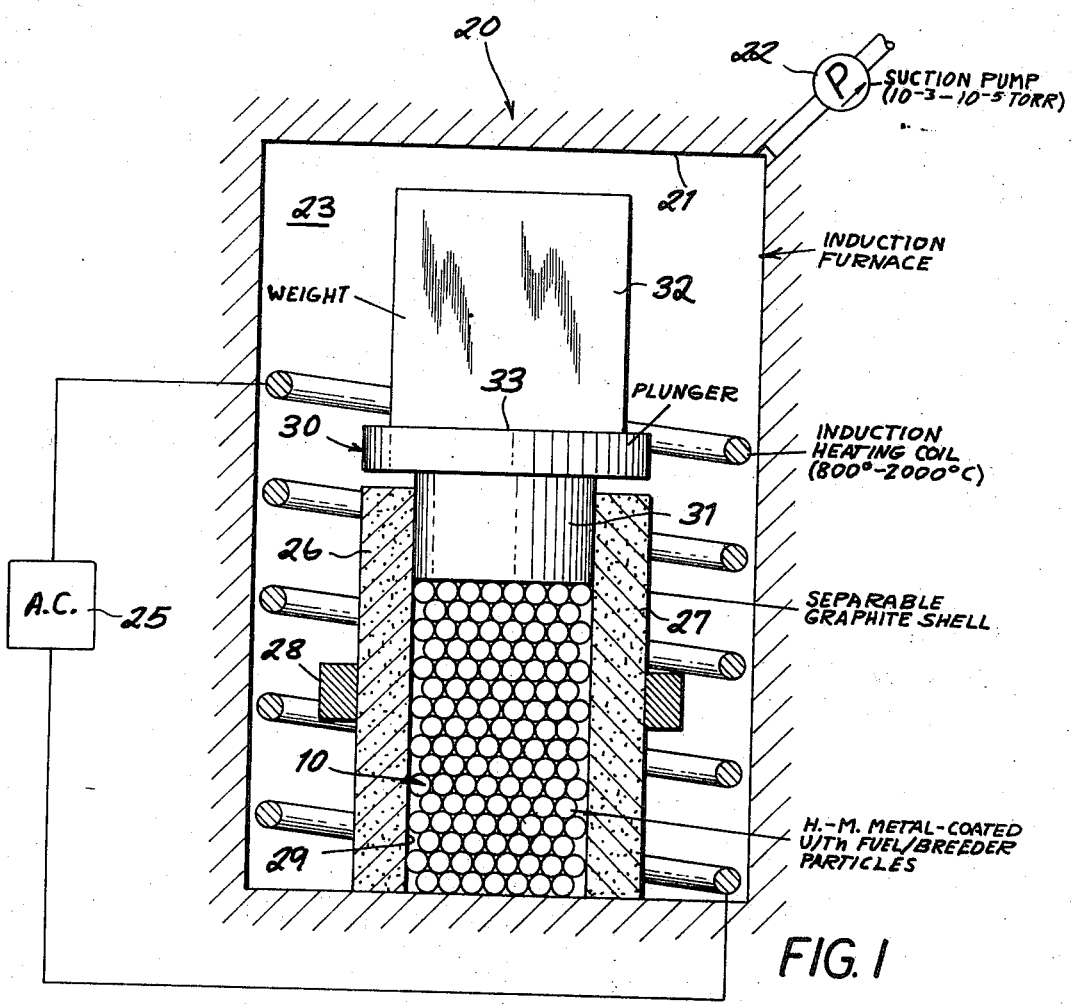

Our present invention relates to a method of or process for producing fuel or breeder bodies for a nuclear reactor and, more particularly, to the production of bonded masses of metal-coated fuel or breeder particles for such reactors.

(2) BACKGROUND OF THE INVENTION

Fuel elements of various types have been proposed for use in the core of a nuclear reactor. Furthermore, such fuel elements may even be dispensed with when the fuel or breeder material is in particualte form for certain reactors. While a large number of fuel and breeder systems are known, a few of these systems deserve special mention.

For example, it is known to provide a can of a metal which is hermetically sealed and contains particles of a fissionable fuel, or a breeder materail which is to be subjected to neutron activation for transmutation into a fuel material. The can serves, on the one hand, as a simple means for retaining the radioactive materials and containing the fission products and, on the other hand, as a means of high thermal conductivity for promoting heat transfer between the radioactive materials within the can and a surrounding coolant. The can system has disadvantages, involving complex handling, and others which need not be reviewed at the present time, as well as disadvantages arising from high cost, etc.

There has also arisen a body of nuclear fuel and breeder technology in which the principal element is the fuel or breeder particle. Such particles consisting of cores of uranium oxides, thorium oxides, mixed uranium/thorium oxides and other compounds constituting fissionable fuels or neutron-activatable fertile materials for breeder-reactor use, and a coating of a heat-resistant material serving as an initial containment for the fission products. It has been proposed heretofore to provide such coatings from pyrolitic carbon or ceramics and particulate fuel and breeder substances of these types have been used heretofore in nuclear reactors, with or without secondary containment. In other words, the particles have been placed in ball-shaped, rod-shaped and other receptacles of metal or graphite, or have been used in reactor systems apart from such receptacles.

For the most part, metal-coated or metal-sheathed fuel or breeder particles, produced in vortex-bed, cyclone and fluidized-bed apparatus, are substantially spherical, have diameters ranging upwards of 100 microns and are usually 400–1000 microns in diameter and have metal coatings of a thickness which may be of the order of microns. Hence, the thickness of the metal coating may be between 1 and 15 microns, preferably between 2 and 10 microns.

The metal coating of the particles serves, as indicated earlier, as an initial containment for the fission products which may be gaseous or solid in nature and tend to migrate away from the fissionable materials of the core as they are formed. It should be noted that, while the fissionable material may be bonded to the remainder of the core, the fission products are free from such bonds and can migrate with the danger of contamination. The metal sheath provided about each particle, therefore, seals these gaseous and solid fission products against escape.

The metal-sheathed nuclear-reactor particles (i.e. fuel or breeder particles with fissionable or neutron-activatable cores) can have metal coatings of low-melting-point metals, e.g. aluminum or tin which have the advantage that the loosely piled particles can be sintered together into a coherent body, the interstices of which form coolant channels. The sintering can be carried out in a resistance-heating or an induction-heating furnace. Such methods have the advantage that the sintering takes place at low temperatures and the core materials are unaffected by the sintering temperature. However, some major disadvantages are present as well. Firstly, the sintered porous bodies are incapable of withstanding high local temperatures, may suffer cracking and other mechanical flaws, etc. Furthermore, the porous sintered body does not yield always an optimum heat-transfer characteristic and its use may create problems in the neutron flux of the reactor. Consequently, it is desirable to use, as the coating metals, high-melting-point substances, such as molybdenum, zirconium, vanadium and niobium of low neutron cross-section, which obviate the aforementioned disadvantages.

However, the fiusion of particles coated with these metals to a porous body has not been practical heretofore because of the high melting points of the materials, the fact that at temperature close to the melting point, the metals engage in side reactions with the materials of the core, and because oxide films are found at the metal-metal interfaces between contacting particles which act as a barrier to sintering.

For example, molybdenum has a melting point of about 2620° C. while zirconium has a melting point of about 3000° C. At temperatures above 2000° C., the aforementioned side reactions between the metal of the sheath and the core material tend to develop. Zirconium, for instance, forms an oxide layer which inhibits sintering.

(3) OBJECTS OF THE INVENTION

It is the principal object of the present invention to provide an economical method of or process for forming porous, dimensionally stable bodies of nuclear-reactor particles having metal coatings of high melting point.

It is another object of our invention to provide an improved porous body for use as or in a fuel element or breeder element for a nuclear reactor, whereby the disadvantages of the above-mentioned earlier systems are obviated.

It is a further object of the invention to provide an improved method of making a sintered body of the character described in which the fissionable or breeder cores are coated with molybdenum, niobium, zirconium or vandaium.

(4) SUMMARY OF THE INVENTION

We have discovered, most surprisingly, that the above objects can be attained, and the previously mentioned disadvantages avoided, by sintering or bonding a mass of metal-coated nuclear particles under a mechanical pressure of several hundred ponds/cm.$^2$ into a porous dimensionally stable body by subjecting the mass under the aforementioned mechanical pressure to a subatmospheric pressure or vacuum of $10^{-3}$ to $10^{-5}$ torr and a temperature of 800° to 2000° C. (1 pond/cm.$^2$ equals 1 gram-force/cm.$^2$)

While applicants do not wish to be bound by any theory in this regard, it has been found that when the particles have a particle size (overall diameter) of 400–1000 microns and the sheath consists of molybdenum, niobium, zirconium or vanadium of a thickness of 2 to 10 microns, the sheaths interdiffuse at their contact points or interfaces and any oxide skin is destroyed.

As a consequence, the spherical shells constituted by the sheaths form a monolithic network extending over the entire body and no thermal or mechanical stress arises at the erstwhile interfaces during the use of the porous body even under the rigorous conditions prevalent in the nuclear reactor. The mechanical pressure may be 100 to 900 ponds/cm.$^2$ while the preferred range is 200 to 600 ponds/cm.$^2$. The sintering time should be of the order of hours, i.e. between 1 and 10 hours, preferably between 2 and 5 hours.

Even more surprising is the fact that, while a mechanical pressure is applied to the loosely piled metal-coated particles, and one normally would expect a sintering step to result in a massive contraction of the bulk, the parameters set forth above for the purposes of the present invention ensure the porosity of the fused body (i.e. guarantees a coolant flow, during use of the body in a nuclear reactor core, through the interstices between the particles) is not hindered. An excellent abstraction of heat from the individual particles by the coolant is thus ensured.

A further advantage of the present system resides in the high thermal conductivity of the metallic sheathing in which the particles are encased and the high surface area over which heat transfer can occur. Since sintering temperatures of at most 2000° C. are employed, there is no significant side reaction between the core material and the shells. With metal sheaths of the aforedescribed thickness and composition, the sintered body has a high flexibility and can be exposed to thermal and mechanical stress without the danger of cracking. Corrosion in the presence of water is eliminated and the system can be used compatibly with other metals which may be present in the reactor.

(5) DESCRIPTION OF THE DRAWING

Figure 2:
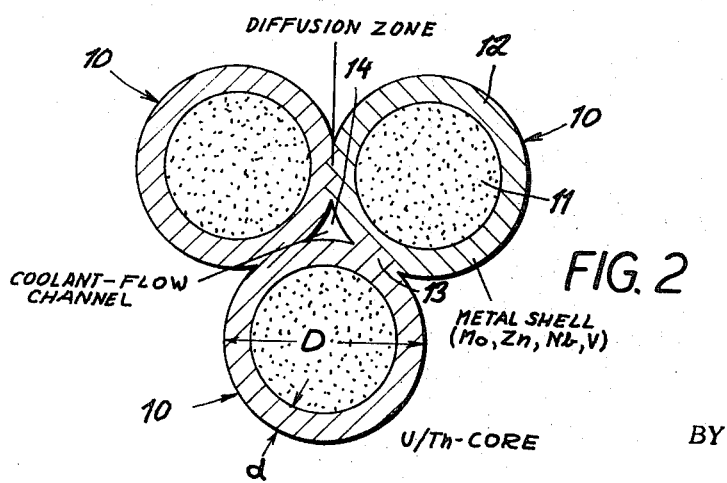

The invention is described in greater detail with reference to the accompanying drawing in which:

FIG. 1 is a diagrammatic cross-sectional view through an apparatus for carrying out the process of the present invention; and FIG. 2 is a detail view, also in diagrammatic form, illustrating the nature of the bond between the individual particles.

(6) SPECIFIC DESCRIPTION

As will be apparent from FIG. 2, each of the particles of the present invention is made in accordance with conventional techniques and has an overall diameter D of 400 to 1000 microns and includes a core 11 and a metal sheath or coating 12. The sheath or coating may have a radial thickness $d$ of 2 to 10 microns and are composed of molybdenum, zirconium, niobium or vanadium. The particles 10 are brought into loosely piled relationship, e.g. as results when the particles are randomly cascaded into a container and thus differ from a closely packed relationship, the points of contact forming diffusion zones 13 at which the metals of the sheaths merge together into a monolithic structure, as illustrated, when the pile of particles is sintered in accordance with the present invention.

The interstitial spaces 14 between the particles remain intact and form coolant-flow channels. The cores are composed preferably of uranium or thorium oxides and may be obtained as described in the commonly assigned copending application Ser. No. 40,695, filed May 26, 1970, and any conventional method of coating for applying the metal sheath may be used.

In FIG. 1, we have shown an apparatus 20 for carrying out the method of the present invention, the apparatus comprising an induction furnace 21 whose chamber 23 may be evacuated by a suction pump 22 to a vacuum of $10^{-3}$ to $10^{-5}$ torr. The induction heating coils 24 are connected to the electric-energy source 25 and surround the furnace chamber although they may equally be disposed therewithin. A pair of semicylindrical graphite shells 26 and 27 are joined by a graphite ring 28 to form a cylindrical cavity 29 within which a mass of the metal-coated particles 10 is received. A plunger 30, having a ram portion 31 corresponding to the cross-section of the chamber 29, is fitted into the latter and bears upon the particles 10 with a force determined by the weight 32 resting upon the head 33 of the piston. As has been noted, this weight should be chosen to apply a pressure of 100 to 900 ponds/cm.$^2$ to the mass of metal-coated particles, the temperature generated within the chamber being 800 to 2000° C. After the mass of particles is fused together over a period of hours, the ring 28 is removed and a cylindrical porous fuel or breeder element is obtained.

(7) SPECIFIC EXAMPLES

Example I

A cylindrical graphite shell composed of two segments with a length of 30 mm. and an inner diameter of 10 mm. is held together by an externally applied graphite ring. The particles are introduced into the shell to a height of 20 mm., have an overall diameter of about 600 microns and are of generally spherical configuration. The cores are uranium-thorium oxide $(U, Th)\text{-}O_2$ and the molybdenum coating has a thickness of about 10 mm.

A graphite plunger is mounted in the shell and has a lower cylindrical portion with a length of 20 mm. and a diameter of 10 mm. while its upper cyclindrical head has a length of 10 mm. and a diameter of 20 mm. Upon this plunger is disposed a molybdenum bath with a weight of about 300 g. This system is introduced into an induction furnace, evacuated to $10^{-5}$ torr and heated to a temperature of 1500° C. After this suction level was reached, heating was maintained for a period of 4 hours whereupon the shell was cooled and opened and the element removed. The element was used as a fuel and breeder element for a nuclear reactor in place of the conventional cans with the coolant being circulated through the interstices of the sintered body.

Example II

The system of Example I was used except that the temperature was raised to 1700° C. and the pressure brought to 300 ponds/cm.$^2$ with a treatment time extending over 2 hours. The physical properties (strength, porosity, etc.) of the resulting body were similar to that of Example I.

Examples I and II were repeated with zirconium, niobium and vanadium and in all cases similar results were obtained.

We claim:

1. A method of forming a coherent porous body for use in a nuclear-reactor core comprising the steps of: forming metal-coated nuclear reactor particles of spherical configuration with an overall particle diameter of 400 to 1000 microns uranium oxide and/or thorium oxide cores and continuous metal sheaths of a thickness of 2 microns, said sheaths being composed of a metal selected from the group which consists of molybdenum, niobium, vanadium and zirconium; loosely piling a mass of said metal-coated nuclear-reactor particles; applying a mechanical pressure to said mass of 100 to 900 grams-force/per cm.$^2$ and subjecting the mass to a vacuum of substantially 10$^{-3}$ to 10$^{-5}$ torr; enclosing said mass under said pressure and vacuum in a graphite form; heating said mass in said graphite form under said mechanical pressure and vacuum with an induction-heating coil to a temperature of 800° C. to 2000° C. but below the flow temperature of the metal of said sheaths at said pressure for a period between two to five hours and sufficient to bond said particles of said mass each one to another while maintaining open-work flow channels among the bonded particles substantially without cross-sectional reduction from the intersticial channels of said mass, thereby producing an open-work rigid body; and removing said open-work rigid body from said graphite form for use directly in contact with a coolant of the nuclear reactor core.

References Cited
UNITED STATES PATENTS

| | | | |
|---|---|---|---|
| 3,579,390 | 5/1971 | Paine | 264—.5 X |
| 3,429,699 | 2/1969 | Fuhrman et al. | 264—.5 X |
| 3,578,610 | 5/1971 | Johnson et al. | 264—.5 |
| 3,463,702 | 8/1969 | D'Eye et al. | 264—.5 X |
| 3,480,702 | 11/1969 | Ford | 264—.5 |
| 3,482,009 | 12/1969 | Carnall, Jr. et al. | 264—.5 |

OTHER REFERENCES

Weast (editor), "C.R.C. Handbook of Chemistry and Physics," 1971–1972, pp. F–259 and F–260.

De Barr and Oliver (editors), "Electrochemical Machining," 1968, pp. 218–219.

BENJAMIN R. PADGETT, Primary Examiner

R. S. GAITHER, Assistant Examiner

U.S. Cl. X.R.

176—91 SP; 252—301.1 R